US005837074A

United States Patent [19]
Uemura

[11] Patent Number: 5,837,074
[45] Date of Patent: Nov. 17, 1998

[54] PNEUMATIC TIRE

[75] Inventor: Yoshiaki Uemura, Kobe, Japan

[73] Assignee: Sumitomo Rubber Industries, Ltd., Hyogo-ken, Japan

[21] Appl. No.: 771,923

[22] Filed: Dec. 23, 1996

[30] Foreign Application Priority Data

Dec. 29, 1995 [JP] Japan ...................................... 7-353094

[51] Int. Cl.$^6$ .......................... B60C 11/03; B60C 101/00; B60C 103/00; B60C 105/00
[52] U.S. Cl. ....................................................... 152/209 R
[58] Field of Search ........................... 152/209 R, 209 D, 152/DIG. 3

[56] References Cited

U.S. PATENT DOCUMENTS

| | | | |
|---|---|---|---|
| 4,057,089 | 11/1977 | Johannsen | 152/209 R |
| 4,700,762 | 10/1987 | Landers | 152/209 R |
| 4,726,407 | 2/1988 | Hayakawa et al. | 152/209 R |
| 5,131,443 | 7/1992 | Kuhr et al. | 152/209 R |
| 5,154,783 | 10/1992 | Kuhr et al. | 152/209 R |
| 5,176,766 | 1/1993 | Landers et al. | 152/209 R |
| 5,234,042 | 8/1993 | Kuhr et al. | 152/209 R |
| 5,421,389 | 6/1995 | Favre et al. | 152/209 R |
| 5,501,258 | 3/1996 | Sulkowski | 152/209 R |

FOREIGN PATENT DOCUMENTS

| | | |
|---|---|---|
| 0488740A1 | 6/1992 | European Pat. Off. . |
| 0588781A1 | 3/1994 | European Pat. Off. . |
| 0627332A1 | 12/1994 | European Pat. Off. . |
| 614574 | 5/1935 | Germany ........................... 152/209 R |
| 3707953A1 | 10/1987 | Germany . |
| 64-36505 | 2/1989 | Japan . |

OTHER PUBLICATIONS

Abstract for Europe 588781.

*Primary Examiner*—Steven D. Maki
*Attorney, Agent, or Firm*—Birch, Stewart, Kolasch & Birch, LLP

[57] ABSTRACT

A pneumatic tire with an improved tread portion capable of reducing a pass-by noise with improving wet performances is disclosed, wherein a central region Y1 of the tread between a pair of first circumferential lines X1 is provided with a wide circumferential groove having a width W1 of from 0.05 to 0.15 times the ground contacting width TW; a pair of middle regions Y2 between the first circumferential lines X1 and second circumferential lines X2 and a pair of shoulder regions Y3 axially outward of the second circumferential lines X2 are not provided with a circumferential groove but axial grooves, the axial grooves extending from the central region Y1 to tread edges and intersect the first circumferential lines X1 at an angle θ1 of from 10 to 25 degrees and the second circumferential lines X2 at an angle θ2 of from 30 to 45 degrees; and each first circumferential line X1 drawn on each side of the tire equator at an axial distance L1 of 0.1 to 0.15 times the width TW, and each second circumferential lines X2 drawn on each side of the tire equator at an axial distance L2 of from 0.325 to 0.375 times the width TW.

4 Claims, 6 Drawing Sheets

PNEUMATIC TIRE

The present invention relates to a pneumatic tire with an improved tread portion capable of reducing a pass-by noise with improving wet performances.

Recently, as a noise from car mechanisms especially gasoline engine is remarkably reduced, a demand for a silent tire is very strong. From an environmental viewpoint, it is effective to reduce the so called pass-by noise, a main cause of which is an air tube resonance sound in a frequency range of 0.8 to 1.0 kHz. A wide circumferential groove in the ground contacting patch of the tire and the ground surface forms an air tube, and a resonance occurs during running, and the resonance sound leaks through axial grooves connected to the circumferential groove and heard as a noise.

It has been known that the air tube resonance sound can be reduced by decreasing the width of a circumferential groove and/or the number of circumferential grooves in the tread.

Such countermeasures however, decrease drainage under wet conditions. Thus wet performances of the tire are inevitably deteriorated.

It is therefore, an object of the present invention to provide to a pneumatic tire in which the above-mentioned contradictory problems can be solved, that is, a pass-by noise is reduced and the drainage is improved.

According to one aspect of the present invention, a pneumatic tire comprises a tread portion having a ground contacting width TW, the tread portion provided in a central region Y1 with a wide circumferential groove having a groove width W1 of from 0.05 to 0.15 times the ground contacting width TW and extending continuously in the tire circumferential direction, the central region Y1 defined between a pair of first circumferential lines X1 each drawn on each side of the tire equator at an axial distance L1 from the tire equator of 0.1 to 0.15 times the ground contacting width TW, the tread portion not provided in a middle regions Y2 and shoulder regions Y3 with a circumferential groove extending continuously in the tire circumferential direction, but a plurality of axial grooves each extending from the central region Y1 through one of the middle regions Y2 and one of the shoulder regions Y3 to one of tread edges, the axial grooves having a groove width W2 of from 0.02 to 0.035 times the ground contacting width TW, the middle regions Y2 defined between the first circumferential lines X1 and a pair of second circumferential lines X2 each drawn on each side of the tire equator at an axial distance L2 from the tire equator C of from 0.325 to 0.375 times the ground contacting width TW, the shoulder regions Y3 each defined as extending axially outwardly from each of the second circumferential lines X2, the axial grooves intersecting the first circumferential lines X1 at an angle $\theta 1$ of from 10 to 25 degrees, and the axial grooves intersecting the second circumferential lines X2 at an angle $\theta 2$ of from 30 to 45 degrees.

Preferably, the middle regions Y2 are provided with sipes having a width of not more than 1.5 mm, wherein, in each region which is surround by the circumferentially adjacent axial grooves G and the first and second circumferential lines X1 and X2, the total LC of the circumferential components of all the sipes therein, the total LW of the axial components thereof, and the ground contacting width TW satisfy: $0.7 \leq (LC+LW)/TW \leq 1.2$.

Embodiments of the present invention will now be described in detail in conjunction with the accompanying drawings, in which.

In the drawings, the pneumatic tire 1 is a radial ply tire for passenger cars, of which aspect ratio (tire section height/width) is not more than 80% in this example 65%.

Figure 1:
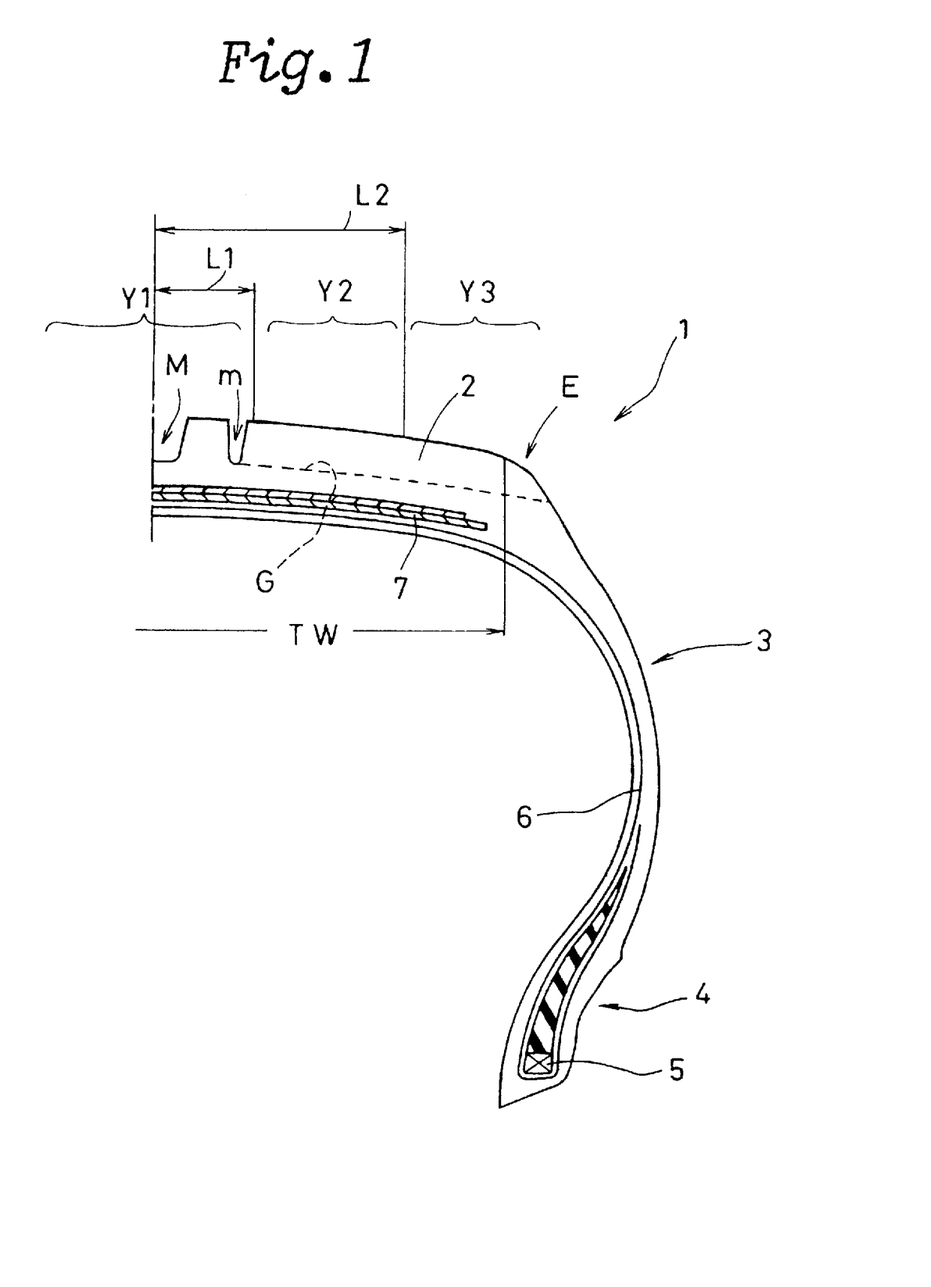
FIG. 1 is a cross sectional view of a tire according to the present invention showing an example of the tire internal structure.

The tire 1 comprises, as shown in FIG. 1, a tread portion 2, a pair of sidewall portions 3, a pair of bead portions 4 with a bead core 5 therein, a radial carcass 6 extending between the bead portions 4 and turned up around the bead cores 5 to be secured in the bead portions 4, and a belt 7 disposed radially outside the carcass 6 and inside the tread.

A central region Y1 of the tread portion 2 is provided with at least one wide circumferential groove M extending continuously in the tire circumferential direction.

A pair of middle regions Y2 and a pair of shoulder regions Y3 of the tread portion 2 are not provided with a circumferentially continuously extending groove, but a plurality of axial grooves G.

Figure 2:
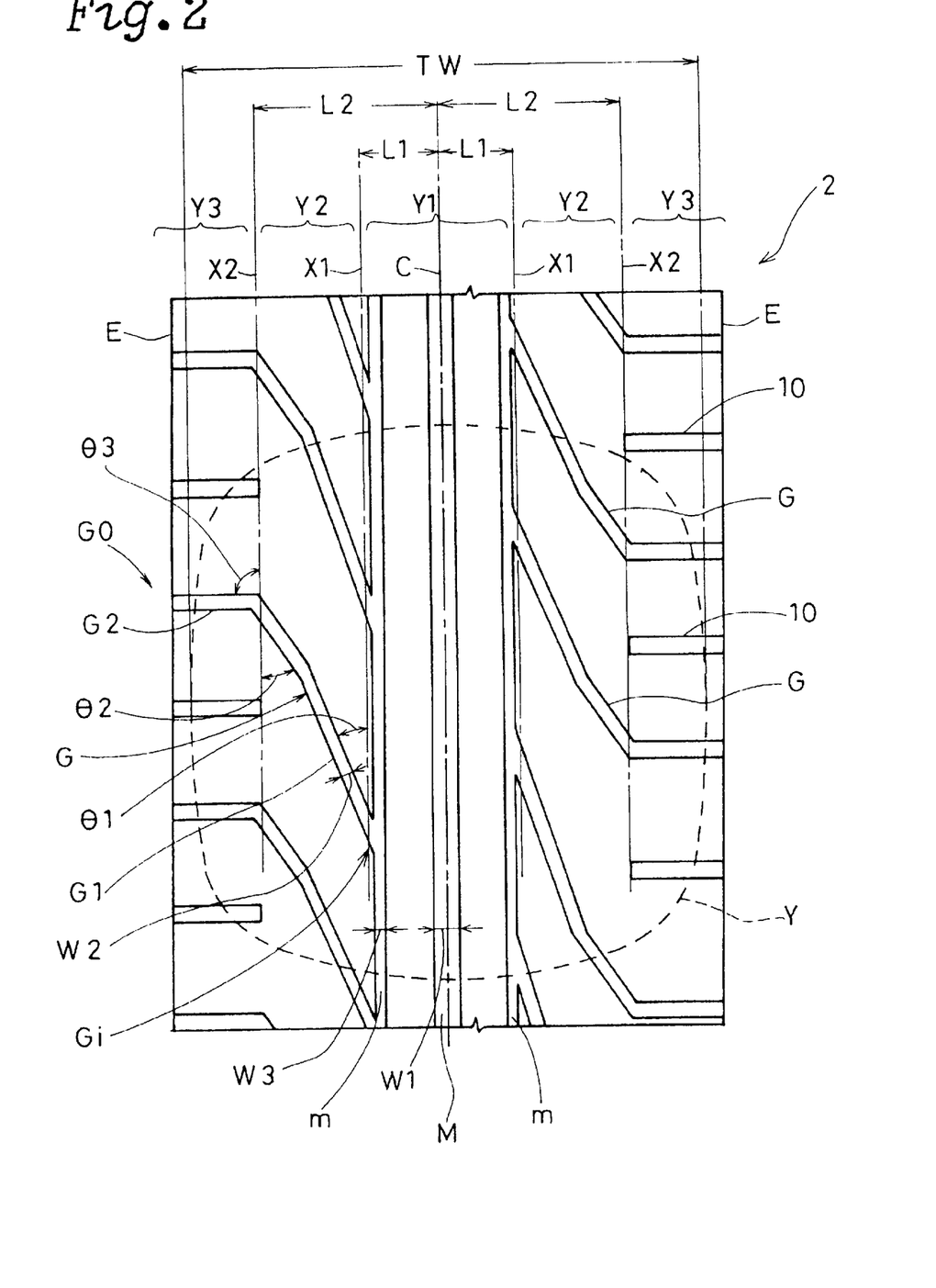
FIG. 2 is a partial plan view thereof showing an example of the tread pattern.

As shown in FIG. 2, the tread pattern is non-directional and the central region Y1 is defined between a pair of first circumferential lines X1 each drawn on each side of the tire equator C at an axial distance L1 from the tire equator C. The distance L1 is 0.125 times the ground contacting width TW of the tread portion 2. For the distance L1, a tolerance of plus minus 0.025 TW can be allowed. (L1=0.1 to 0.15 TW)

Each of the middle regions Y2 is defined between one of the first circumferential lines X1 and a second circumferential line X2 drawn at an axial distance L2 from the tire equator C. The distance L2 is 0.35 times the ground contacting width TW. For the distance L2, a tolerance of plus minus 0.025 TW can be allowed. (L2=0.325 to 0.375 TW).

Each of the shoulder regions Y3 is defined as extending axially outwardly from the second circumferential line X2.

Here, the ground contacting width TW is defined as the maximum ground contacting width between the axial outermost edges of the ground contacting area Y when the tire is mounted on its standard rim and inflated to a standard pressure (2.0 kgf/sq.cm in this example), and then loaded with 70% of the maximum load. As the standard rim a rim officially approved for the tire by, for example JATMA (Japan), TRA (USA), ETRTO (Europe) and the like is used. Also as the standard pressure and the maximum load, those specified by the same associations are used.

The wide circumferential groove M is centered on the tire equator C, and the groove width W1 thereof is set in the range of from 0.05 to 0.15 times the ground contacting width TW. The wide circumferential groove M is independent, namely, no groove is connected thereto, and in this example a straight groove. Therefore, a big drainage towards the front and rear directions is provided in the central region Y1. Even if an air tube resonance phenomenon occurs because the groove M is wide, the resonance sound hardly leaks because no groove is connected.

In this embodiment as the aspect ratio is relatively low and thus the tread is wide, in order to provide an additional drainage for the tread, the central region Y1 is further provided on each side of the wide circumferential groove M with a narrow circumferential groove m extending continuously in the tire circumferential direction. The narrow circumferential groove m is a straight groove, and the groove width W3 thereof is less than 0.05 times, in this example 0.02 to 0.035 times the ground contacting width TW.

Therefore, the drainage from the central region Y1 can be further improved without increasing the air tube resonance sound because an air tube resonance phenomenon hardly occurs in such a narrow groove.

The circumferential grooves M and m are preferably straight, but a gentle zigzag or wavy configuration may be used.

The above-mentioned axial grooves G have a relatively narrow groove width W2 of from 0.02 to 0.035 times the ground contacting width TW for the similar reason.

The axial grooves G extend across the whole width of the middle region Y2 and shoulder region Y3, and the inner end Gi of each axial groove G is connected to one of the narrow circumferential grooves m, and the outer end Go thereof is opened in the tread edge E.

When the narrow circumferential grooves m are not provided, the inner ends Gi are preferably terminated in the central region Y1 without connecting to the central wide circumferential groove M.

The main part G1 of the axial groove G which is defined as a part in the middle region Y2 intersect the above-mentioned first circumferential line X1 at an angle θ1 of from 10 to 25 degrees and intersect the second circumferential line X2 at an angle θ2 of from 30 to 45 degrees.

Figure 3:
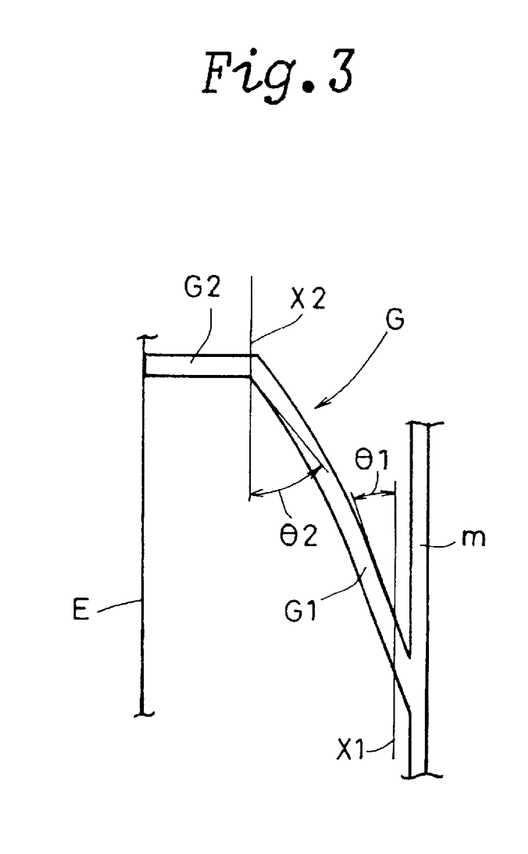
FIG. 3 is an enlarged plan view showing another example of the axial groove.

Therefore, in the example shown in FIG. 2, the main part G1 is bent in the middle thereof so as to be composed of two straight segments. However, it may be possible to form the main part G1 with a smoothly curved single part as shown in FIG. 3.

The outer part G2 of the axial groove G which is defined as a part in the shoulder region Y3 is inclined at an angle θ3 of from 90 to 60 degrees, in this example 90 degrees with respect to the tire circumferential direction. Accordingly, the axial groove G is bent at the line X2, forming an angle of 60 to 45 degrees.

In each of the middle regions Y2, the number of the axial grooves G which is equal to the number of all the existing grooves (exclude sipes) is preferably set in the range of from 25 to 45 in case of passenger car tires. If the number is less than 25, the improvement in wet performance is insufficient. If the number is more than 45, running noise increases.

In each of the shoulder regions Y3 in this example, a rug groove 10 is disposed between the axial grooves G, which rug groove 10 is substantially the same as the outer part G2 in respect of the width and inclination angle. Therefore, the number of all the existing grooves (exclude sipes) is doubled.

Figure 4:
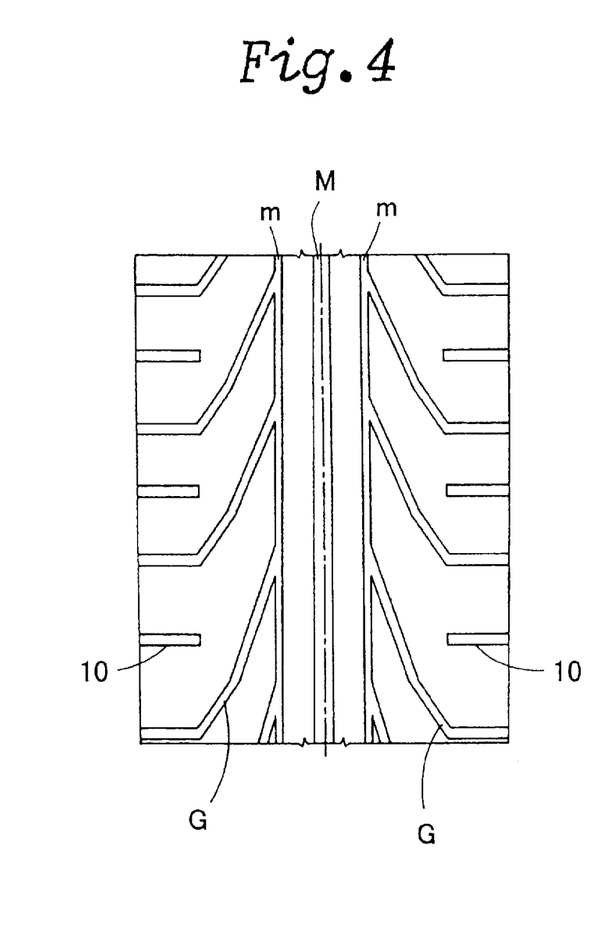
FIGS. 4, 5, 6 and 7 each show another example of the tread pattern according to the invention.

On each side of the tire equator C, the axial grooves G are inclined to the same direction. In FIG. 2, the inclining direction on one side is the same as the other side. However, the inclining direction on one side can be reversed to the other side as shown in FIG. 4. The tread pattern shown in FIG. 4 is otherwise the same as the above-mentioned pattern shown in FIG. 2.

If the groove width W1 is more than 0.15 TW, the resonance noise is liable to leak. If the groove width W1 is less than 0.05 TW, the wet performances are greatly decreased.

If the groove width W2 is more than 0.035 TW, the noise is liable to increase. If the groove width W2 is less than 0.02 TW, the wet performances are greatly decreased.

As explained above, the inclination angle of the axial grooves G to the circumferential direction is relatively smaller in the axially inner part. Therefore, in and near the central region Y1, the axial grooves G function as a circumferential groove to improve drainage in this region. Further, the inclination angle is larger in the axially outer part. Therefore, the groove line is akin to the actual flow line of the water discharged sideways from the tread center, and the resistance to water flow decreases. Furthermore, the middle and shoulder regions Y2 and Y3 are not provided with a circumferential groove, and the axial grooves G have a narrow width and an inclination angle. Accordingly, the occurrence of air tube resonance is effectively prevented to decrease the pass-by noise.

Figure 5:
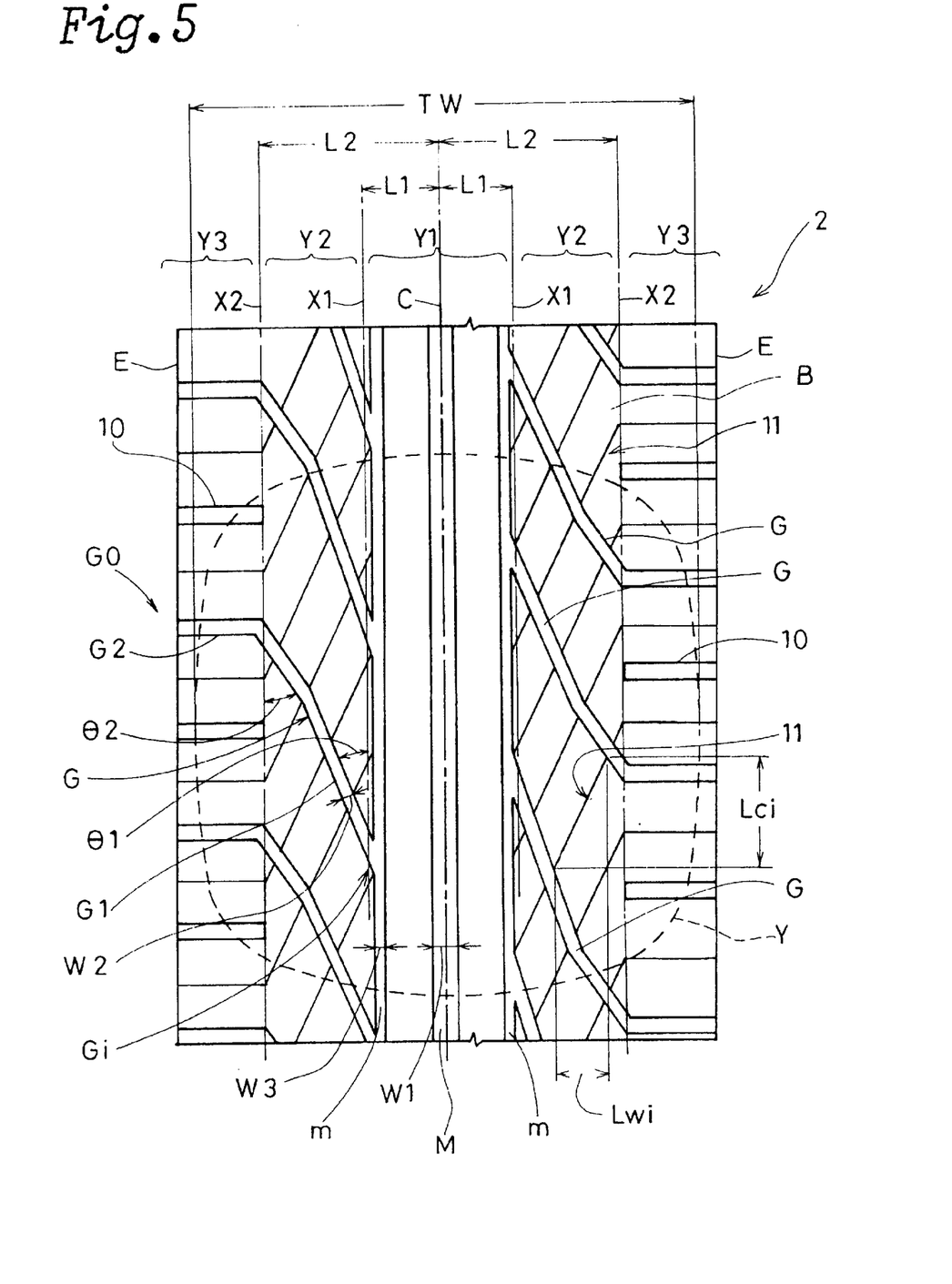
Figure 6:
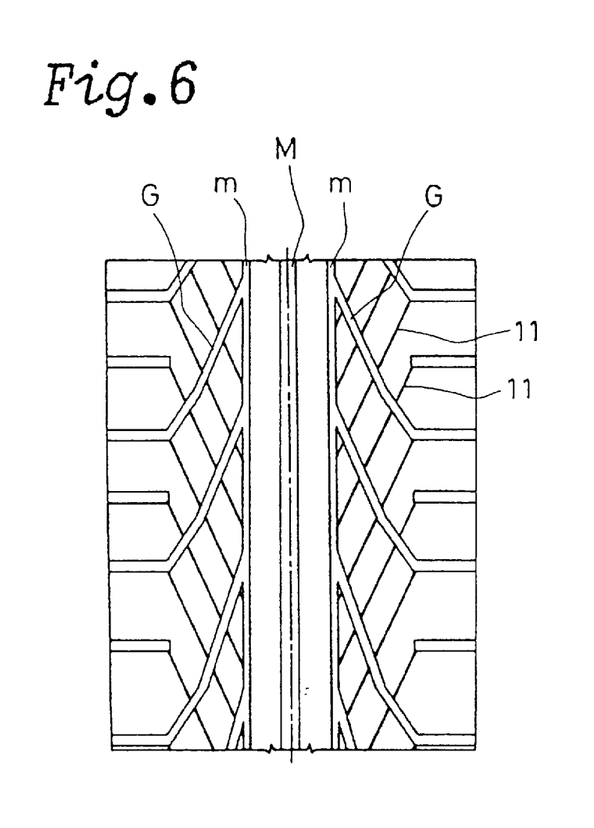

FIGS. 5 and 6 show modification of the tread patterns shown in FIGS. 2 and 4, respectively, wherein sipes 11 are disposed in the middle regions Y2 and optionally in the shoulder regions Y3. Here, a sipe is a cut or slit having a width of not more than 1.5 mm and less than the width W3 of the narrow circumferential grooves m.

Each sipe 11 has two ends which are not terminated in the tread rubber and opened to the above-mentioned grooves inclusive of the circumferential grooves M and m, axial grooves G and rug grooves 10.

In each region which is surround by the circumferentially adjacent axial grooves G and the first and second circumferential lines X1 and X2 and thus of which shape is generally a parallelogram, the total LC of the circumferential components Lci of all the sipes 11 therein, the total LW of the axial components Lwi thereof, and the above-mentioned ground contacting width TW satisfy the following relationship:

$$0.7 \leq (LC+LW)/TW \leq 1.2.$$

If (LC+LW)/TW<0.7, the generally parallelogram region is liable to become high in pattern rigidity to deteriorate ride comfort. Further, an edge effect decreases and a good on-the-snow performance can not be obtained. If (LC+LW)/TW>1.2, the pattern rigidity becomes excessively low and the steering stability decreases.

Figure 7:
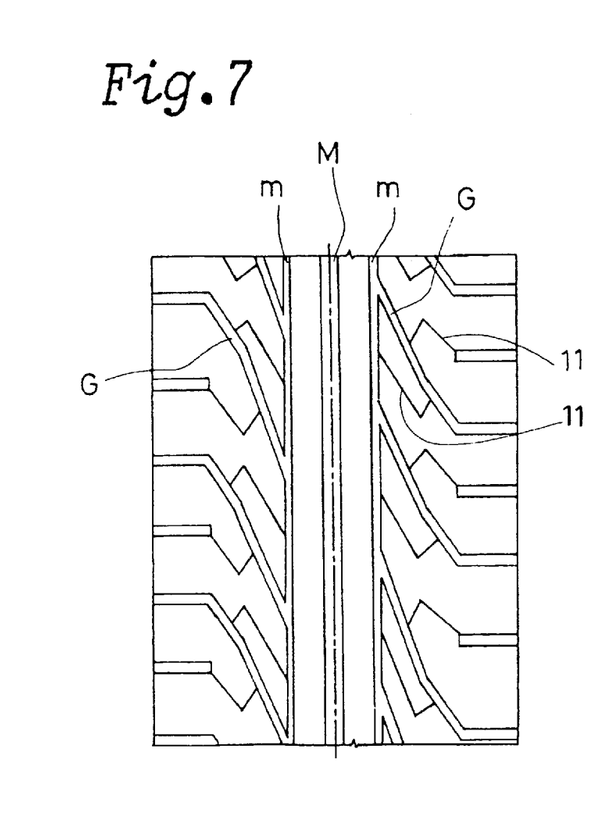

The sipes 11 in FIGS. 5 and 6 are straight in the middle regions Y2, but it is possible to bent the sipes as shown in FIG. 7.

Comparison Tests

Test tires having the same internal structure shown in FIG. 1 but different tread patterns were made by way of test, and the following tests were made.

1. Wet performance test i. Aquaplaning test (cornering)

Running the test car in a 100 meter radius test course having a paved surface provided with a 20 meter length 5 mm depth water pool, the lateral acceleration (lateral G) was measured increasing stepwise the running speed, and the average lateral G in the range of from 70 to 90 km/h was calculated.

ii. Aquaplaning test (straight running)

In a straight test course having a paved surface provided with a 10 mm depth water pool, the running distance to stop when the full breakes were applied at a speed of 40 km/h was measured.

iii. On-the-snow performance test

Running the test car on a snowy road surface, the braking, starting and acceleration were evaluated by the driver's feelings. The results are indicated by an index based on that the tire No.9 is 100. The larger the value, the better the performance.

2. Pass-by noise test

According to the "Test Procedure for Tire Noise" specified in Japanese JASO-C606, the test car was coasted for 50 meter distance at 60 km/h and 35 km/h in a straight test course, and the maximum noise sound level was measured with a microphone set at 1.2 meter height from the road surface and 7.5 meter sideways from the course.

3. Noise feeling test, Ride comfort test and Steering stability test

The test car was run on various road surfaces in a test course, and the performances were evaluated by the test driver's feelings. The results are indicated by an index based on that the tire No.9 is 100. The larger the index, the better the performance.

The test results and tire specifications are shown in the following Table 1.

Through the tests, it was confirmed that the tires according to the present invention were improved in both the aquaplaning performance and pass-by noise.

TABLE 1

Figure 8:
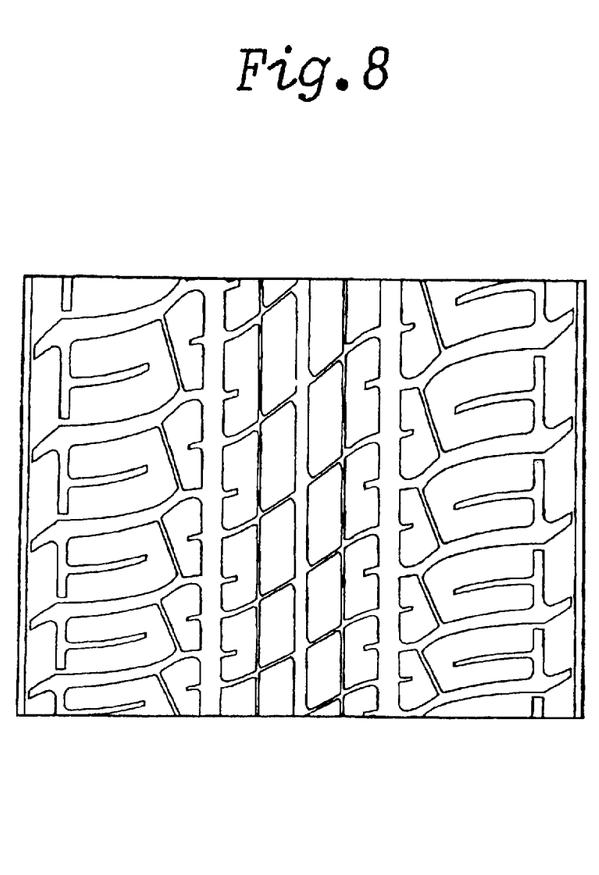
FIG. 8 shows a tread pattern outside the present invention used in comparison tests.

|  | Test Tire No. | | | | | | | | |
| --- | --- | --- | --- | --- | --- | --- | --- | --- | --- |
|  | 1 Ref. 1 | 2 Ex. 1 | 3 Ex. 2 | 4 Ref. 2 | 5 Ex. 3 | 6 Ex. 4 | 7 Ex. 5 | 8 Ex. 6 | 9 Ref. 3 |
| Tread Pattern | FIG. 2 | FIG. 2 | FIG. 2 | FIG. 2 | FIG. 5 | FIG. 5 | FIG. 5 | FIG. 5 | FIG. 8 |
| Tread width TW (mm) | 140 | 140 | 140 | 140 | 140 | 140 | 140 | 140 | 140 |
| Center wide groove M | | | | | | | | | |
| Width W1 (mm) | 11.0 | 11.0 | 11.0 | 11.0 | 11.0 | 11.0 | 11.0 | 11.0 | |
| W1/TW ratio | 0.08 | 0.08 | 0.08 | 0.08 | 0.08 | 0.08 | 0.08 | 0.08 | |
| Narrow groove m | | | | | | | | | |
| Width W3 (mm) | 4.2 | 4.2 | 4.2 | 4.2 | 4.2 | 4.2 | 4.2 | 4.2 | |
| W3/TW ratio | 0.03 | 0.03 | 0.03 | 0.03 | 0.03 | 0.03 | 0.03 | 0.03 | |
| Axial groove G | | | | | | | | | |
| Width W2 (mm) | 4.0 | 4.0 | 4.0 | 4.0 | 4.0 | 4.0 | 4.0 | 4.0 | |
| W2/TW ratio | 0.03 | 0.03 | 0.03 | 0.03 | 0.03 | 0.03 | 0.03 | 0.03 | |
| Intersecting angle θ 1 (deg) | 5 | 12 | 23 | 30 | 23 | 23 | 23 | 23 | |
| Intersecting angle θ 2 (deg) | 35 | 35 | 35 | 35 | 35 | 35 | 35 | 35 | |
| No. of grooves | | | | | | | | | |
| Middle region | 40 | 40 | 40 | 40 | 40 | 40 | 40 | 40 | |
| Shoulder region | 80 | 80 | 80 | 80 | 80 | 80 | 80 | 80 | |
| Sipes in Middle region | non | non | non | non | | | | | non |
| Total circum. component LC (mm) | | | | | 58 | 32 | 51 | 90 | |
| Total axial component LW (mm) | | | | | 68 | 38 | 61 | 106 | |
| LC + LW | | | | | 126 | 70 | 112 | 196 | |
| (LC + LW)/TW | | | | | 0.90 | 0.50 | 0.80 | 1.40 | |
| Test results | | | | | | | | | |
| Wet performance | | | | | | | | | |
| Aquaplaning (cornering) | 101 | 103 | 104 | 105 | 105 | 105 | 105 | 102 | 100 |
| Aquaplaning (straight) | 103 | 102 | 102 | 100 | 102 | 102 | 102 | 100 | 100 |
| On-the-snow | 98 | 100 | 100 | 101 | 108 | 102 | 106 | 106 | 100 |
| Pass-by noise | | | | | | | | | |
| @ 35 km/h (dB) | −0.6 | −0.8 | −0.9 | −0.6 | −1.0 | −1.0 | −1.0 | −1.1 | 0.0 |
| @ 60 km/h (dB) | −0.7 | −0.9 | −1.0 | −0.7 | −1.2 | −1.1 | −1.2 | −1.1 | 0.0 |
| Noise feeling | 103 | 102 | 101 | 98 | 103 | 102 | 103 | 102 | 100 |
| Ride comfort | 100 | 100 | 100 | 100 | 103 | 102 | 102 | 103 | 100 |
| Steering stability | 99 | 100 | 100 | 99 | 100 | 101 | 100 | 97 | 100 |

Tire size: 195/65R15
Rim size: 15X6JJ standard rim
Pressure: Normal pressure of 2.0 kgf/sq · cm
Test car: 2000 cc passenger car with the test tires mounted on all wheels

I claim:

1. A pneumatic tire comprising
a tread portion having a ground contacting width the tread portion provided in a central region with a wide circumferential groove having a groove width W1 of from 0.05 to 0.15 times the ground contacting width and extending continuously in the tire circumferential direction,
the central region defined between a pair of first circumferential lines each drawn on each side of the tire equator at an axial distance from the tire equator of 0.1 to 0.15 times the ground contacting width, the tread portion not provided in a middle regions and shoulder regions with a circumferential groove extending continuously in the tire circumferential direction, but being provided with a plurality of axial grooves each extending from the central region through one of the middle regions and one of the shoulder regions to one of tread edges, the axial grooves having a groove width of from 0.02 to 0.035 times the ground contacting width,
the middle regions defined between the first circumferential lines and a pair of second circumferential lines each drawn on each side of the tire equator at an axial distance from the tire equator of from 0.325 to 0.375 times the ground contacting width, the shoulder regions each defined as extending axially outwardly from each of the second circumferential lines, the axial grooves intersecting the first circumferential lines at an angle of from 10 to 25 degrees, the axial grooves intersecting the second circumferential lines at an angle of from 30 to 45 degrees, the tread portion further provided in the central region with a pair of narrow circumferential grooves each disposed on each side of the wide circumferential groove, the narrow circumferential grooves having a groove width of less than 0.05 times the ground contacting width, and the axially inner ends of the axial grooves connected to the narrow circumferential grooves.

2. The pneumatic tire according to claim 1, wherein in the middle regions, the number of the axial grooves is in the range of from 25 to 45.

3. The pneumatic tire according to claim 1, wherein the tread portion is provided in the middle regions with sipes having a width of not more than 1.5 mm, and in each region which is surrounded by the circumferentially adjacent axial grooves and the first and second circumferential lines, the total LC of the circumferential components of all the sipes therein, the total LW of the axial components thereof, and the ground contacting width TW satisfy the relationship $0.7 \leq (LC+LW)/TW \leq 1.2$.

4. The pneumatic tire according to claim 1, wherein the axial grooves on a first side of the tire equator intersect the first and second circumferential lines at angles complementary to corresponding angles of the axial grooves on a second side of the tire equator.

* * * * *